(12) United States Patent
Abbott

(10) Patent No.: US 6,688,577 B2
(45) Date of Patent: Feb. 10, 2004

(54) SELF DRAINING VALVE

(76) Inventor: W. T. David Abbott, 625 Old Wagon Rd., Seymour, TN (US) 37865

( * ) Notice: Subject to any disclaimer, the term of this patent is extended or adjusted under 35 U.S.C. 154(b) by 5 days.

(21) Appl. No.: 10/060,037

(22) Filed: Jan. 30, 2002

(65) Prior Publication Data

US 2003/0141471 A1 Jul. 31, 2003

(51) Int. Cl.$^7$ ............................................. F16K 31/126
(52) U.S. Cl. ............................. 251/30.02; 251/129.17; 251/331
(58) Field of Search ...................... 251/30.01–30.05, 251/129.01–129.22, 318–334

(56) References Cited

U.S. PATENT DOCUMENTS

| | | |
|---|---|---|
| 2,389,134 A | 11/1945 | Brown |
| 2,454,929 A | 11/1948 | Kempton |
| 2,620,133 A | 12/1952 | Obermaier |
| 2,697,581 A | 12/1954 | Ray |
| RE24,255 E | 12/1956 | Lund |
| 2,775,984 A | 1/1957 | Dahl |
| 3,006,378 A | 10/1961 | Erickson |
| 3,894,688 A * | 7/1975 | Reeder ........................ 239/11 |
| 4,732,362 A | 3/1988 | Morioka |
| 4,846,440 A | 7/1989 | Carlson |
| 4,969,629 A | 11/1990 | Athanassiu |
| 5,014,694 A * | 5/1991 | DeVries ................. 128/205.24 |
| 5,065,786 A * | 11/1991 | Rozenblatt ................... 137/202 |
| 5,136,774 A * | 8/1992 | Neff ....................... 251/129.18 |
| 5,193,578 A * | 3/1993 | Noriyuki ..................... 137/521 |
| 5,232,010 A * | 8/1993 | Rozenblatt et al. ............ 251/58 |
| 5,275,086 A * | 1/1994 | Stallings, Jr. ................ 137/328 |
| 5,511,864 A * | 4/1996 | Reinartz et al. .......... 303/119.2 |
| 5,706,859 A * | 1/1998 | Backlund ..................... 251/331 |

* cited by examiner

Primary Examiner—Paul J. Hirsch
(74) Attorney, Agent, or Firm—Kevin P. Crosby, Esq.; Daniel C. Crilly, Esq.; Brinkley, McNerney, Morgan Solomon & Tatum, LLP

(57) ABSTRACT

A self-draining, valve for fluid flow control. Upon removal of fluid supply pressure from the valve, the valve automatically reverts to a partially open state allowing fluid in the valve to drain. The disclosed valve is particularly useful in applications where draining of fluids with bio-matter or other contaminants is desired after removal of supply pressure in order to reduce contamination buildup and/or permit thorough cleaning.

14 Claims, 7 Drawing Sheets

SELF DRAINING VALVE

FIELD OF THE INVENTION

The present invention relates to fluid valves, and, particularly to fluid valves that are electrically controllable and allow for automatic self draining upon removal of supply fluid pressure from the valve.

BACKGROUND OF THE INVENTION

Electronically operated valves that control fluid flow in an on/off manner are used in many applications. Electronically operated valves that use a diaphragm to control fluid flow wherein the diaphragm deflects in response to hydraulic forces formed by the flow of fluid through the valve are known in the art as a diaphragm valve. One example of such a prior art valve is depicted as reference number 10 in FIGS. 1–3. The valve involves a diaphragm 103 that is in contact with an opening or diaphragm seat 108 formed on an outlet tube 110 and which has a lower surface 114. The valve 10 has a solenoid armature 105 that plugs a control opening 112 in the middle of the diaphragm 103. The control opening is also located over the outlet tube opening 108. When fluid supply under pressure is applied at the inlet tube 101, the diaphragm top surface 113 (in the orientation shown in FIG. 1) is exposed to a fluid pressure approximately equal to the supply fluid pressure because the fluid delivered to the inlet tube 101 is in communication with the diaphragm top surface 113 through rim hole 104. Rim hole 104 is located remotely from the outlet tube opening 108 and has a diameter smaller than control opening 112. The entire diaphragm top surface 113 is exposed to fluid pressure that is approximately equal to the supply pressure, while only the area of the diaphragm bottom surface 114 that is not within the outlet tube opening 108 is exposed to the same pressure. Since more area of diaphragm top surface 113 is exposed to the supply pressure than diaphragm bottom surface 114, the diaphragm 103 is forced into contact with and a seal is formed between the diaphragm 103 and the outlet tube opening 108.

When the solenoid armature 105 is retracted into the solenoid cavity 115 through the application of current to the solenoid coil 107, the control opening 112 allows fluid from the upper chamber 111 to drain into the outlet tube 110 because the pressure in the outlet tube 110 is less than the supply pressure in the inlet tube 101. Since the size of the rim hole 104 is smaller than the control hole 112, more fluid passes out of the upper chamber 111 and into the outlet tube than is admitted through the rim hole 104. This results in a drop in pressure (and resulting force) against the diaphragm top surface 113, thereby resulting in a lifting of the diaphragm 103 by the pressure along the diaphragm bottom 114, thus causing the valve to open.

Once the valve is in the open state, i.e. the diaphragm 103 is away from the outlet tube opening 108, the flow of fluid between the outlet tube opening 108 and the diaphragm bottom 114 results in a drop in fluid pressure near the outlet tube opening 108. If the solenoid armature 105 is re-engaged into the control hole 112, higher pressure will again develop along the diaphragm top 113 by fluid entering the rim hole 104 and combined with the lower pressure along the diaphragm bottom 114, the diaphragm 103 will re-engage the outlet tube opening 108, thereby closing the valve.

The prior art valve in the instant example utilizes a diaphragm 103 that is designed and located so as to be stable in one of two states. When supply fluid pressure is present and the solenoid armature 105 is engaged into the control opening 112 of the diaphragm 103, the diaphragm 103 remains in the down, or closed, state. When supply fluid pressure is present and the solenoid armature 105 is removed/lifted from the control opening, the diaphragm 103 moves "up", or to the open state. Upon removal of supply fluid pressure, the diaphragm 103 returns to the "down" state wherein the diaphragm 103 re-engages the outlet tube opening 108. FIGS. 2 and 3 also demonstrate diaphragm 103 resting atop diaphragm seat 108 in a relaxed state whether or not armature housing 403 is placed in sandwiching relation thereupon, in the absence of supply fluid pressure. That is, in the prior art valve shown in FIGS. 1, 2 and 3, diaphragm 103 remains in sealing engagement with seat 108 in the absence of input fluid pressure in inlet tube 101 and with or without the influence of armature 105.

The prior art valve illustrated in FIG. 1 remains "closed" even when the supply fluid pressure is removed. In some applications, such as in hot tubs and whirlpool baths, the fluid may contain undesirable material such as bio-matter. Allowing the fluid with this undesirable matter to remain in the closed valve and associated tubing for an extended period of time may result in contamination of the fluid, valve and tubing and an unsanitary condition.

It is to be noted that this short coming in presently available valves applies to virtually any type of valve, not just diaphragm valves. All valves, gate valves, and all the others known to those of skill in the art, are designed so as to prevent fluid flow across the valve boundary when the valve is in its closed state. Consequently, use of any such pre-existing valve in applications such as those referenced above is less than desirable.

SUMMARY OF THE INVENTION

It is an object of the present invention to provide an improved valve design that automatically provides for drainage of the valve upon removal of supply pressure.

In its preferred form the invention employs a modification of the prior art valve shown in FIGS. 1–3 such that the diaphragm, in its "at rest" position (as shown in FIG. 6), namely, when the supply fluid pressure is equal to or approximately zero, is spaced from seat 108 a distance sufficient to readily permit the flow of supply fluid from inlet conduit 101 to outlet conduit 110. In this way, when the flow of liquid is discontinued through the valve, any remaining liquid in the valve can freely drain, also permitting the entire system of conduits to which the valve is connected to drain as well.

The existing valve can be modified by lowering the position of the seat 108 relative to the at rest location of the bottom surface 114 of diaphragm 103, raising the lower surface 114 of diaphragm 103 relative to seat 108, or permitting the position of one or the other to be adjusted depending upon the viscosity and other characteristics of the supply liquid.

The present invention achieves this and further objectives by providing a valve having three stable states. When input fluid pressure is applied and the solenoid is de-energized, the diaphragm seats against seat 108, terminating flow through the valve, as with prior art valves. When input fluid pressure is applied, and the solenoid is energized, fluid can flow between volumes 101 and 109 as in the prior art. However, when input fluid pressure is removed, the valve is constructed so as to cause the diaphragm to enter a third, stable, state wherein the diaphragm does not seat against the orifice seat 108 of the outlet tube, but is partially removed from that orifice, causing the valve to remain open so that fluid on either side of the diaphragm can drain off.

BRIEF DESCRIPTION OF THE DRAWINGS

The specification uses the following figures to illuminate the preferred embodiments of the present invention. However, it is to be understood that the invention is not intended to be limited to the embodiments shown, which are merely exemplary and not by way of limitation.

DESCRIPTION OF THE PREFERRED AND ALTERNATE EMBODIMENTS

Figure 4:
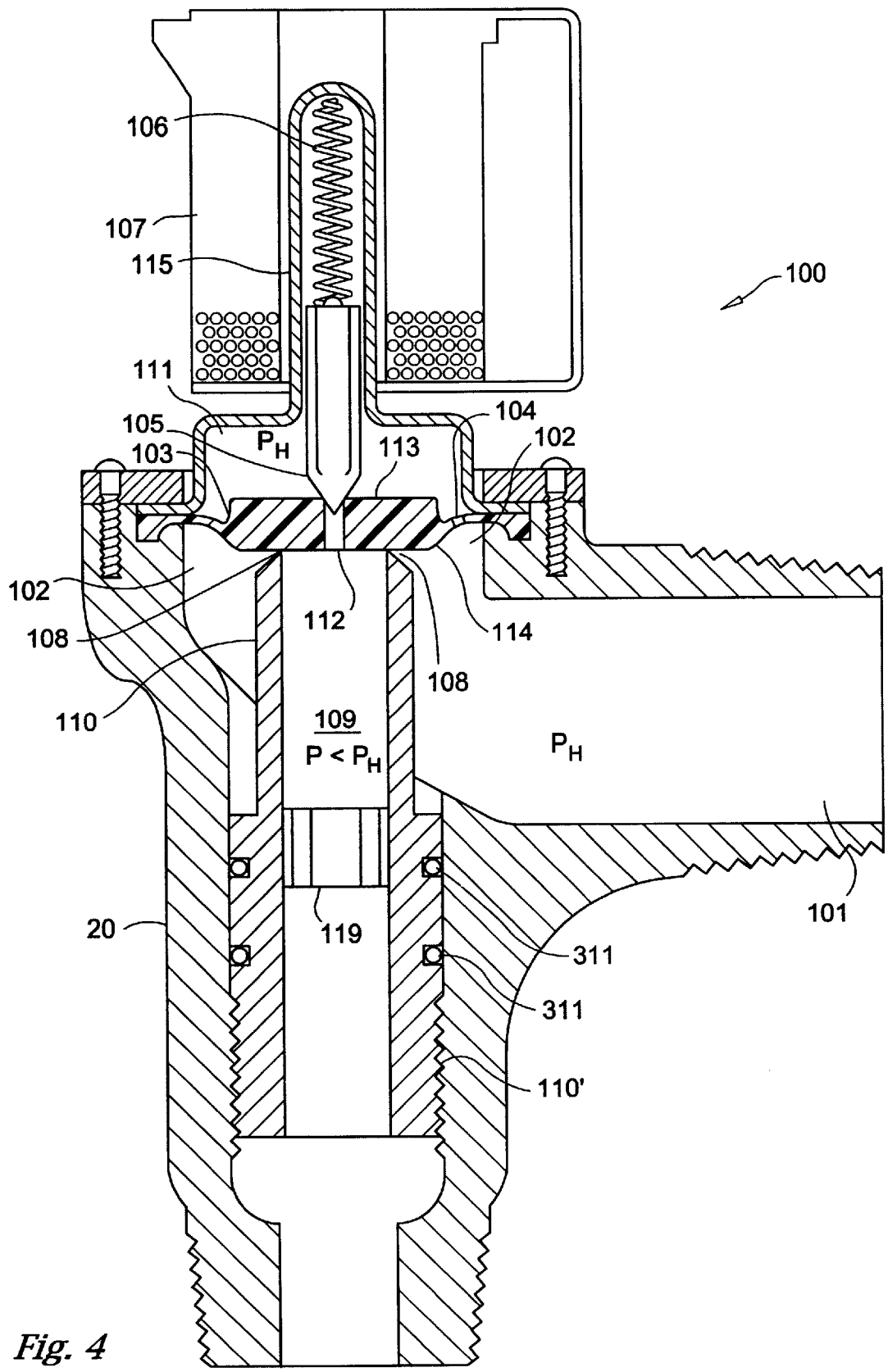
FIG. 4 is a cross-sectional elevational view of the preferred embodiment of the invention with inlet fluid supply pressure present and the solenoid de-energized.
Figure 5:
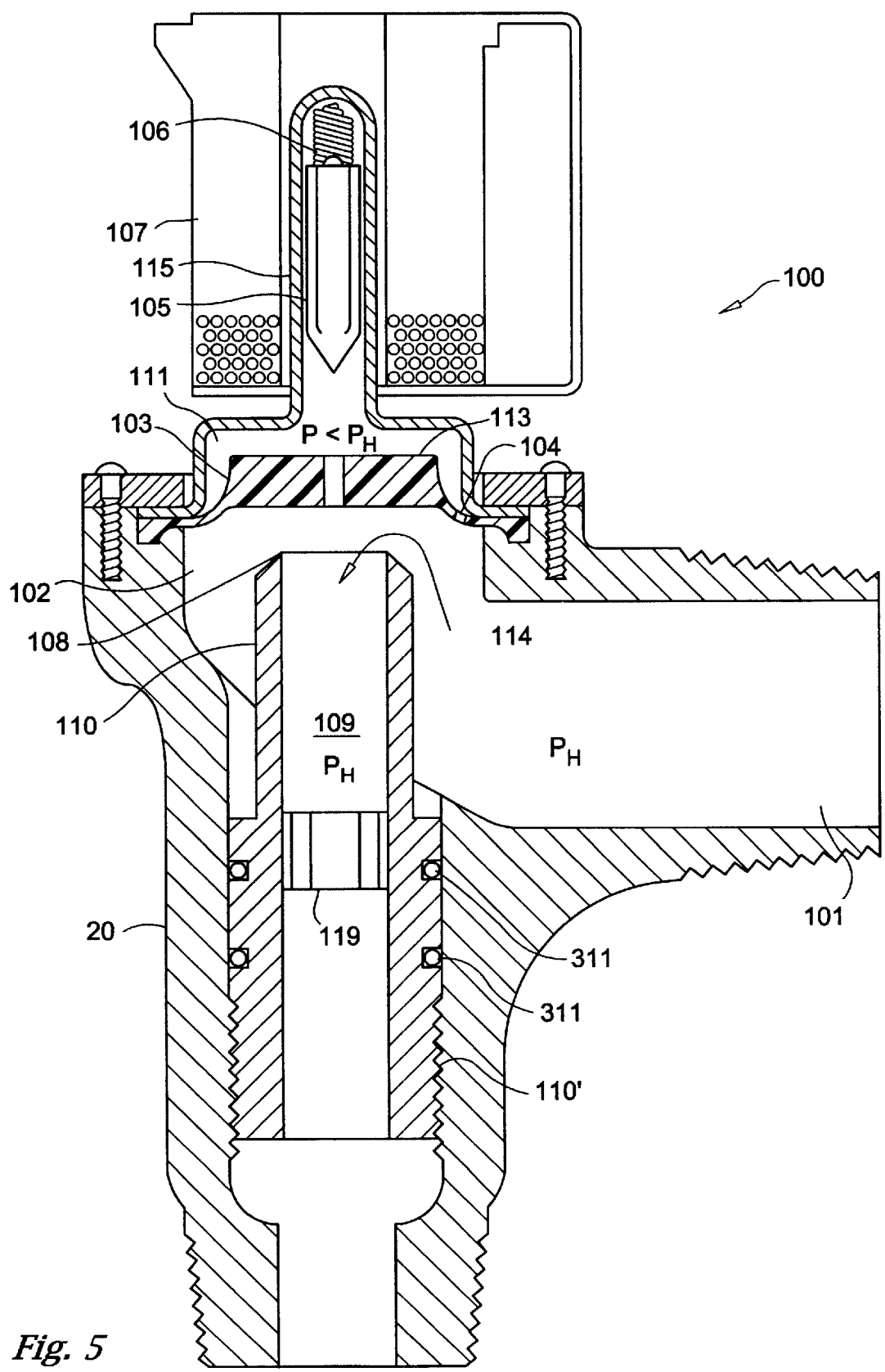
FIG. 5 is a cross-sectional elevational view of the valve of FIG. 4 with inlet fluid supply pressure present and the solenoid energized.
Figure 6:
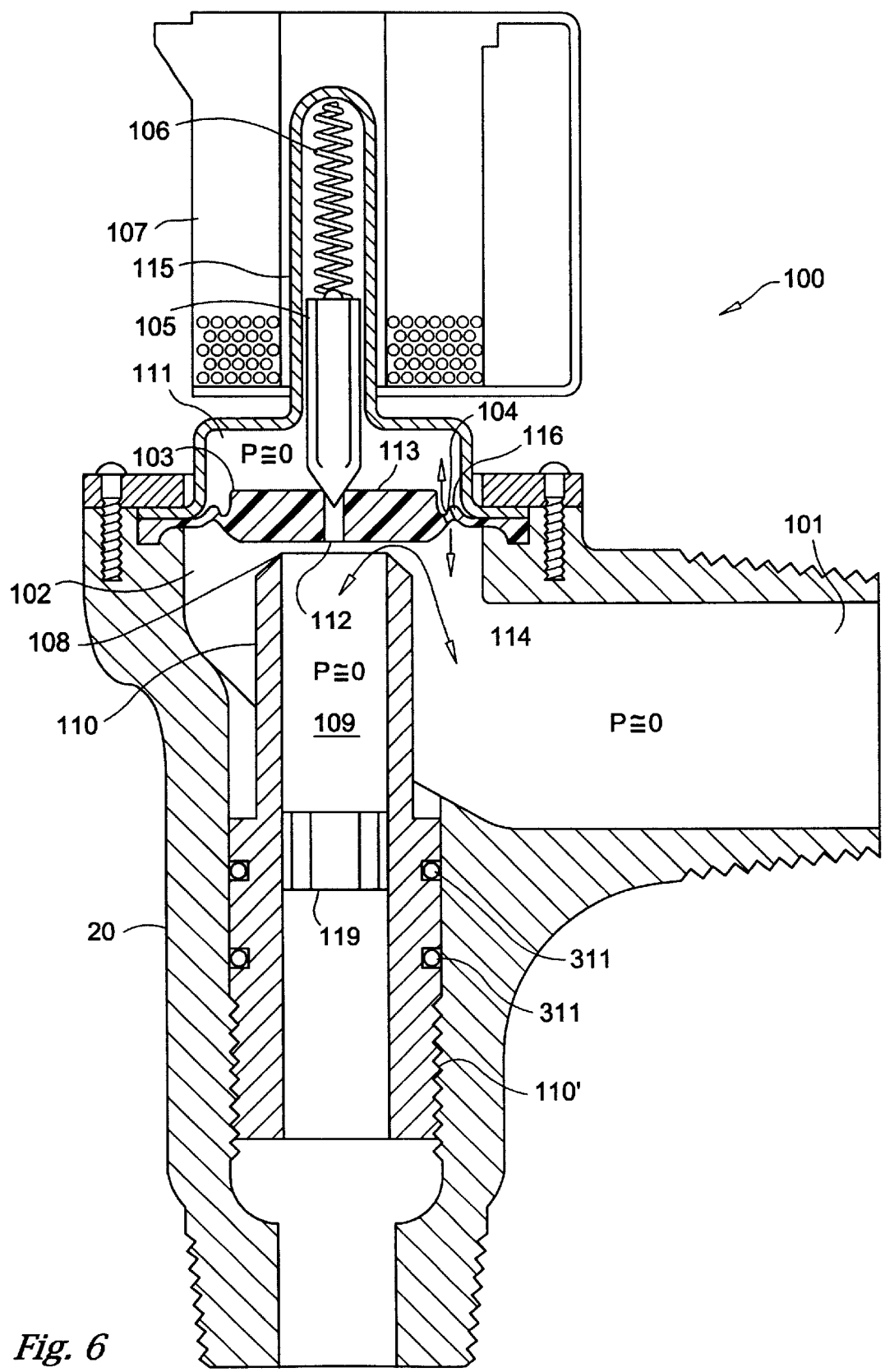
FIG. 6 is a cross-sectional elevational view of the valve of FIGS. 4 and 5 with inlet fluid supply pressure removed.

The description of the preferred embodiment will be aided by the use of FIGS. 4 through 6, wherein the same number identifies the same or similar items. The preferred embodiment is a valve which is ideally suited for use in a hot tub or whirlpool tub wherein water is re-circulated into the hot tub or whirlpool tub at a pressure provided by a pump. However, the device may also be employed in any application where it is desired to selectively provide fluid communication from one side of a valve mechanism to another and to cause the valve to self-drain when fluid pressure is removed.

The description of the present invention will refer to the drawings and refer to component placement according to the orientation within the drawings. For example, the description will use the terms "above" and "below" in connection with the figures. It is obvious that reorientation of components may be made as is recognized by those skilled in the relevant arts without departing from the scope of the claimed invention.

A preferred embodiment of the invention is comprised of a valve body 20 having an inlet orifice 101 which fluidly communicates with, under certain circumstances, an outlet or discharge conduit 110. Conduit 110 terminates at its upper end in an opening or seat 108 which, under certain conditions, is sealingly engaged by diaphragm 103. As can be seen, when armature 105 is de-energized, it sits in control opening 112, thus preventing fluid communication there through. Under the conditions of FIG. 4, supply fluid is present in inlet conduit 101 having a pressure of $P_H$, which fluidly communicates with upper surface 113 of diaphragm 103 through rim hole 104, thus exerting a downward force upon diaphragm 103, causing its lower surface 114 to seal against outlet conduit seat or opening 108, thereby preventing fluid from flowing from conduit 101 into outlet conduit 110.

FIG. 6 shows a cut-away view of the preferred embodiment of the present invention in the absence of supply water pressure. As is shown, the diaphragm 103 is at its natural, or "rest," position parallel to but removed from the outlet tube opening 108 because the valve components are sized and arranged such that a gap is present between seat 108 and lower surface 114 of diaphragm 103 in the absence of inlet supply liquid pressure, such that $P_H$ is equal to or approximately 0. The diaphragm 103 of the preferred embodiment is made of a flexible material such as rubber or an elastomeric material known to those skilled in the relevant arts. The diaphragm 103 is sufficiently flexible to allow movement of the diaphragm 103 from contact with the outlet tube opening 108 as is shown in FIG. 4, through its natural position as shown in FIG. 6 and on through to an open, flow, position as is shown in FIG. 5. The diaphragm 103 of the preferred embodiment may or may not incorporate a diaphragm bend 116 so as to provide the rigidity to remain in its natural position yet allow movement through the other two states shown in FIGS. 4 and 5. Seals 311 shown in FIGS. 4–6 may be O rings or any suitable member.

The solenoid armature 105 of the preferred embodiment rests in control opening 112 by gravity and/or solenoid spring 106. Simply removing the force of the solenoid armature 105, through application of current to the solenoid coil 107, does not, by itself, cause significant movement of the diaphragm 103. The diaphragm is deflected primarily by hydraulic pressure formed by fluid flowing as discussed herein.

Upon application of fluid supply pressure into the inlet tube 101 when solenoid 107 is energized, armature 105 will be moved out of contact with control opening 112 and fluid will flow through the inlet manifold 102, between the outlet tube opening 108 and diaphragm 103, and proceed out through the outlet tube 110. Fluid will likewise flow through rim hole 104 and into the upper chamber 111. Once solenoid 107 is de-energized, the solenoid armature 105 will occupy the control opening 112, the fluid in the upper chamber 111, which is above the diaphragm 103, will be at the supply pressure, while the fluid below the diaphragm 103 will drain through the outlet tube 110 and therefore be at a lower pressure over part of the area of the diaphragm's bottom 114. This lower pressure over part of the diaphragm bottom 114 will cause the diaphragm 103 to seat against outlet tube opening 108. Once the diaphragm 103 is forced onto the outlet tube opening 108, the total force of fluid pressure on the diaphragm top 113, which has fluid pressing along the entire diaphragm top 113 at supply pressure due to communication of fluid between the inlet manifold 101 and the upper chamber 111 through rim hole 104, is greater than the total force along the diaphragm bottom 114 since the respective surface areas on the top and bottom of the diaphragm against which fluid pressure $P_H$ is exerted are different. The difference in pressure between the diaphragm top 113 and diaphragm bottom 114 overcomes the force supplied by the diaphragm 103 to remain in its natural position as shown in FIG. 6. This pressure difference thereby causes the diaphragm 103 to remain engaged onto the outlet tube opening 108 while fluid pressure is applied as is shown in FIG. 4.

Application of current to the solenoid coil 107 will result in translation of the solenoid armature 105 from engagement with the control opening 112 into the solenoid cavity 115. Upon translation of the solenoid armature 105 from the control opening 112, fluid in the upper chamber 111 will flow through the control opening 112 and into the outlet tube 110. Since the pressure in the outlet tube 110 is lower than the supply pressure and the size of the rim hole 104 is smaller than the control opening 112, the pressure of the fluid in the upper chamber 111 will decrease. As the force exerted on the diaphragm bottom 114 by the fluid in the inlet manifold exceeds the force exerted on the diaphragm top 113 by the fluid in the upper chamber 111 (because the fluid is draining through control opening 112), the diaphragm 103 will move away from the outlet tube opening 108. As the diaphragm 103 moves away from the outlet tube opening 108, fluid in the inlet manifold 102 will flow directly into the outlet tube interior 109. The pressure in the outlet tube interior 109 is lower than the supply pressure, thereby causing the fluid to flow into the outlet tube 110, and therefore the fluid in the area above the outlet tube opening 108, as shown in FIG. 5, will also be at a lower pressure than the supply pressure. The area of the control opening 112 is greater than the area of rim hole 104 and the pressure underneath the control opening 112, which is in the center of the outlet tube opening 108, is lower than the supply pressure and the pressure exerted on rim hole 104. The lower pressure, relative to the pressure in the inlet manifold 102 and rim hole 104, that is exerted underneath control opening 112 results in a lower average pressure in the upper chamber 111 than is exerted on the entire diaphragm bottom 114 by the fluid in the inlet manifold 102. This is shown in FIG. 5 and will exist as long as the solenoid armature 105 is removed from the control opening 112.

Upon removal of current from the solenoid coil 107, the solenoid spring 106 will move the solenoid armature 105 into contact with the control opening 112. This will prevent fluid from draining through the control opening 112 and will result in the pressure in the upper chamber 111 equaling the pressure exerted on the rim hole 104, which is approximately the supply pressure. As long as the diaphragm 103 is not in contact with the outlet tube opening 108, fluid will flow through the outlet tube 110. The flow of fluid through the outlet tube 110 results in a pressure in the outlet tube interior 109, and of the fluid in the immediate area of the outlet tube opening 108, i.e. above the outlet tube 110 as shown in FIG. 5, being lower than in the remainder of the inlet manifold 102. The communication of fluid from the inlet manifold 102 to the upper chamber 111 through rim hole 104 will cause the pressure in the upper chamber 111 to approximately equal the supply pressure. The force on the diaphragm bottom 114, which has substantially the same area as the diaphragm top 113, will be lower because of the lower average pressure on the diaphragm bottom 114 due to fluid flow out of the outlet tube 110. This force differential between the diaphragm bottom 114 and the diaphragm top 113 will cause the diaphragm 103 to move toward the outlet tube opening 108 until the diaphragm 103 engages the outlet tube opening 108.

It is obvious that the solenoid may also operate so as to have the armature 105 removed from the control opening 112 when deactivated, and thereby require activation to engage the control opening 112.

The natural or equilibrium position of the diaphragm 103 of the preferred embodiment as shown in FIG. 6 is between engagement with the Outlet tube opening 108 and the fully open position caused by the lower pressure in the upper chamber 111 as shown in FIG. 5. Alternative embodiments may utilize a natural position of the diaphragm 103 that is substantially similar to the open position Although not necessary, in one form of the invention outlet conduit 110 may be movable relative to valve body 20, such as by the use of threads 110' disposed in valve body 20 and outlet conduit 110 respectively. Sealing means such as o-rings 311 may be employed. Alternative structure for permitting movement of outlet conduit 110, and hence seat 108, relative to the lower surface 114 of diaphragm 103 will occur to those of skill in the art and are considered to be a part of this invention. A contoured surface 119 within outlet conduit 110 such as a hexagonal pattern adopted to be engaged by an "Allen" wrench may be utilized to permit turning of outlet conduit 110 relative to valve body 20 to thereby adjust the height of seat 108 up or down. In this way, the valve of the instant invention may be utilized with a variety of different operating fluids. Fluids of greater viscosity, for example, will need a larger gap between seat 108 and surface 114 to cause drainage in the at rest state, such that outlet conduit 110 can be rotated so as to cause same to be raised or lowered by the action of the screw threads 110'. Since it is quite common for a particular valve to be utilized under different pressures or with different working fluid viscosities, the ability to adjust the height of seat 108 up or down permits an operator to find the proper clearance for the particular fluid density and supply pressure being employed at any particular time.

Figure 2:
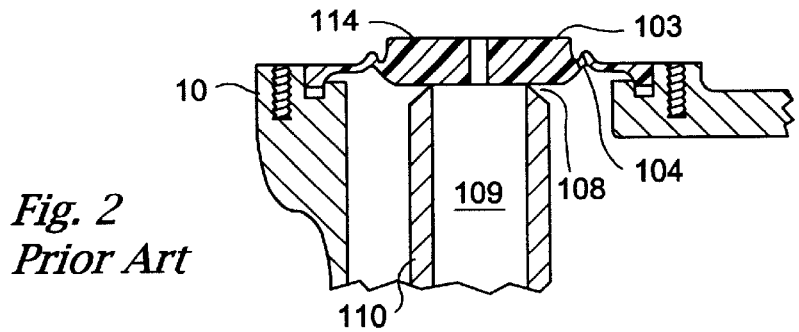
FIG. 2 is a cross-sectional partial cut-away view of the prior art valve of FIG. 1 prior to installation of the armature housing and corresponding clamp.
Figure 3:
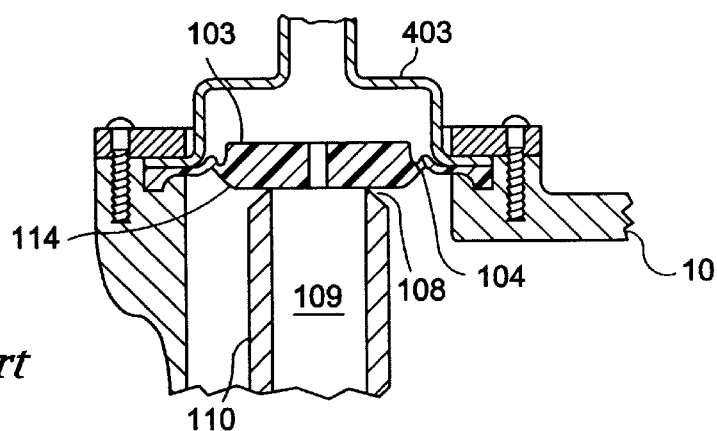
FIG. 3 is a cross-sectional partial cut-away elevational view of the prior art valve of FIGS. 1 and 2 after application of the armature housing and clamp.
Figure 7:
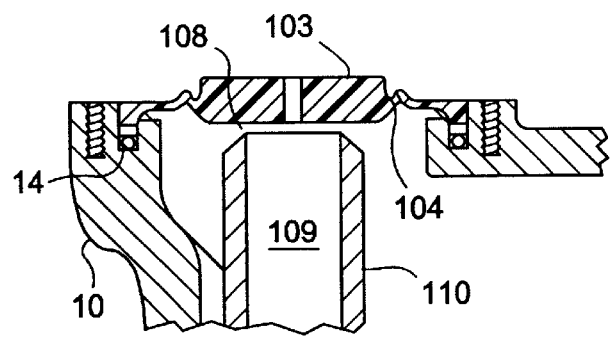
FIG. 7 is a cross-sectional elevational partial cut-away view of an alternative form of the invention partially disassembled.
Figure 8:
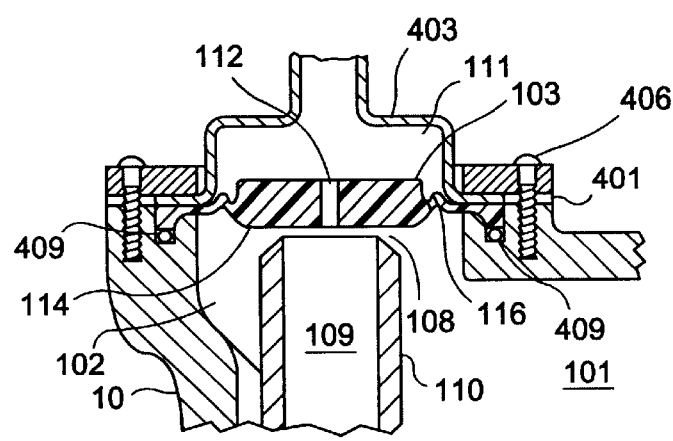
FIG. 8 is a cross-sectional elevational partial cut-away view of the alternative form of the invention shown in FIG. 7 after assembly.

Another embodiment of the present invention is implemented through the modification of an existing diaphragm valve to incorporate the invention. The designs of some diaphragm valves support easy modification through the installation of inexpensive components so as to implement the present invention. The relevant portions of a prior art valve that has been modified so as to incorporate the present invention is shown in FIGS. 7–8. The design of the prior art valve in FIGS. 7–8 utilize a removable chamber cover 403 to form the top part of the upper chamber 111. This chamber cover 403 was constructed so as to secure the circumferential edge of the diaphragm 103 to the valve housing 10 by pressing the edge of the diaphragm 103 into a diaphragm seat 14. Modification of the prior art valve comprises removing the chamber cover 403, placing a spacing plate or gasket 401 above diaphragm 103 and spacer such as an O-ring 409 below diaphragm 103, as is shown in FIG. 8, or vice versa, and then re-securing the chamber cover 403 with longer screws 406 so as to accommodate the spacing plate 401. O-ring 409 is preferably a ring of rubber or similar material that is placed under the edge of diaphragm 103 so as to raise the diaphragm 103 away from the outlet tube opening 108 to create the desired "at rest" gap between diaphragm 103 and seat 108 when $P_H$ is zero. Alternative modifications may use a chamber cover and/or diaphragm 103 that incorporates the spacing plate 401 and/or a replacement diaphragm 103 that incorporates the spacing plate and/or O-ring 409 in the diaphragm itself. Other structural arrangements for raising diaphragm 103 from its position shown in FIGS. 1–3 relative to seat 108 will occur to those skilled in the art and are considered to be within the scope of this invention.

Figure 1:
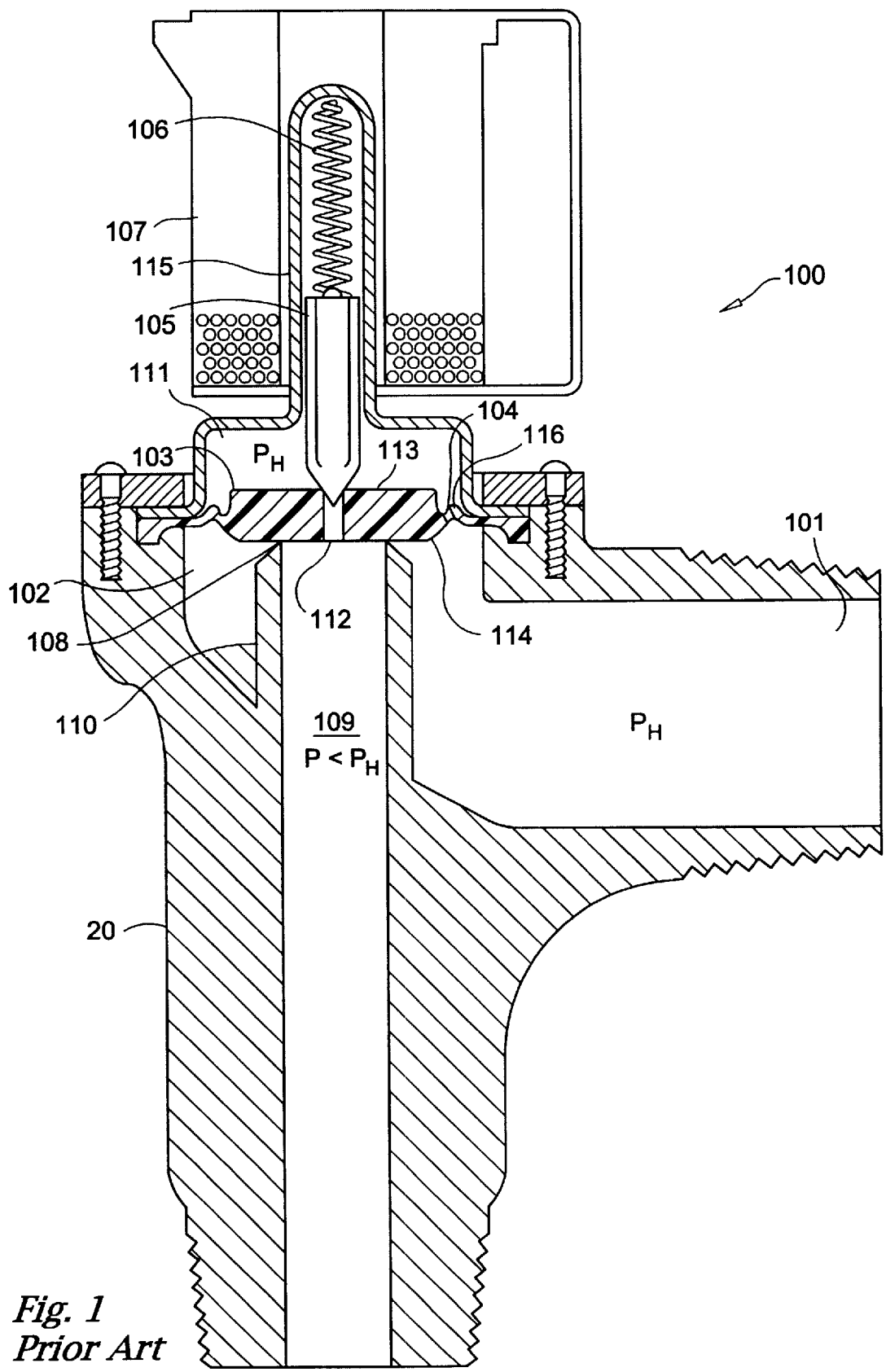
FIG. 1 is cross-sectional elevational view of a prior art closed diaphragm valve with inlet fluid supply pressure supplied.
Figure 9:
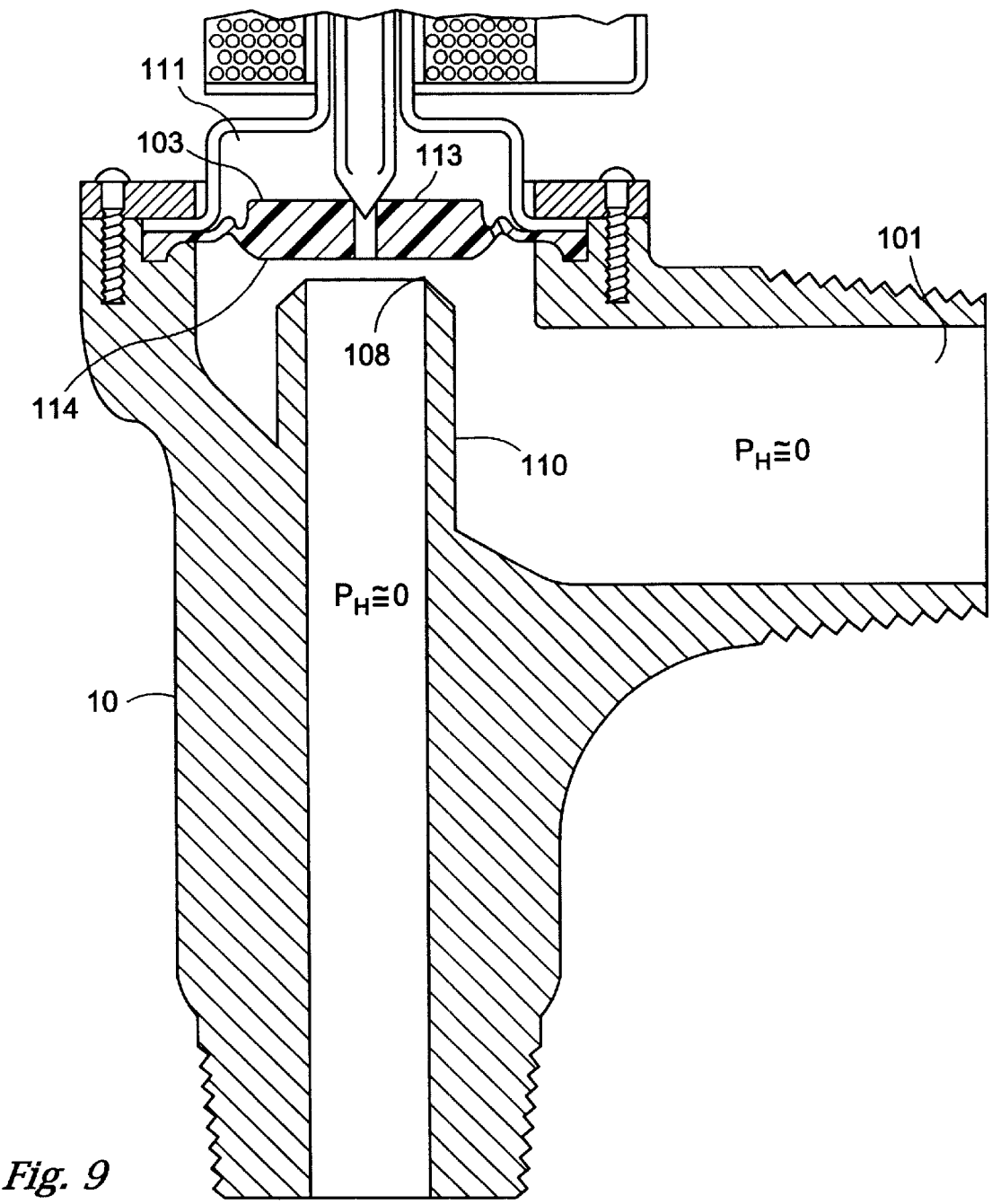
FIG. 9 is a cross-sectional elevational view of a third embodiment of the instant invention.

A still further embodiment of the invention, shown in FIG. 9, is constructed with outlet conduit 110 shortened such that seat 108 is in a lower position relative to lower diaphragm surface 114 than that shown in FIG. 1 when valve body 10 is manufactured. In this way, diaphragm 103 will remain in a position above seat 108 when $P_H$ is equal to zero. Seat 108 may be cast or machined to a lower position, eliminating the pre-load on the diaphragm in the device shown in FIGS. 1–3 and allowing a clearance or gap between seat 108 and diaphragm 103 when the supply fluid pressure is off. This embodiment is particularly suited in applications where the operating pressures and viscosities of the working fluids are constant within a particular seat/diaphragm clearance setting, such that the valve can be constructed with that clearance pre-set in the body 10. Since, in this alternative form of the invention, there will be no need for the adjustable outlet conduit 110 shown in FIGS. 4–6, the valve can be manufactured at a lower cost.

It is to be appreciated that the invention disclosed herein may also be practiced in non-diaphragm valves and still fall within the scope of the appended claims. For example, the "gate" closure element in a gate valve may be provided with a small opening to permit drainage there through of fluid when the supplied pressure is zero. Likewise, a ball valve may be provided with a similar aperture or other passage way to permit drainage of supply fluid when the supply fluid pressure is substantially zero.

Figure 10:
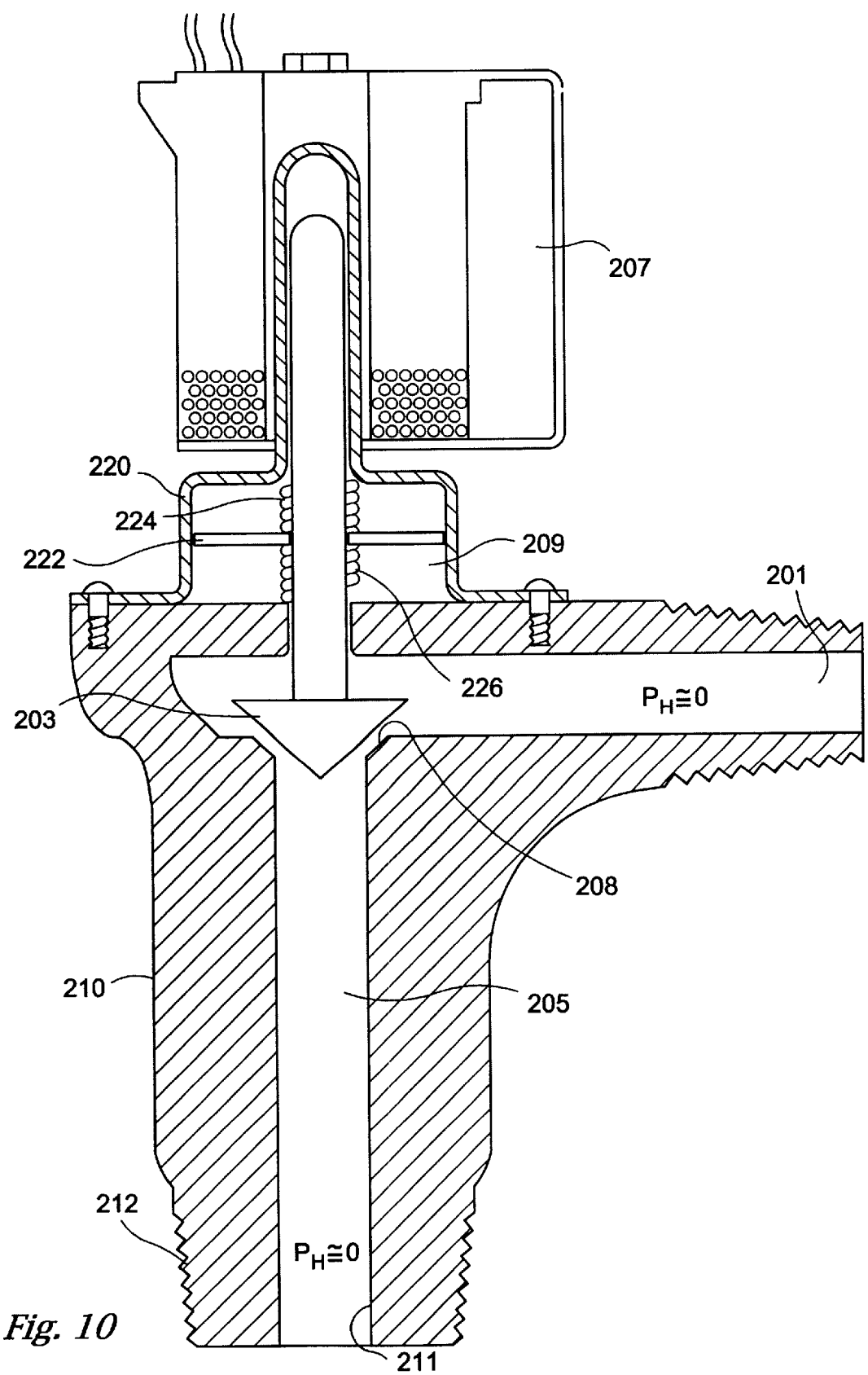
FIG. 10 is a cross-sectional elevational view of a fourth embodiment of the instant invention.

FIG. 10 shows a fourth embodiment of the Invention in which a plug valve is provided having a valve body 210 defining an inlet opening 201 and an outlet opening 211 defined by outlet conduit 212. Outlet conduit 212 defines a valve seat 208 onto which is intended to seat a plug valve head 203, which may be in any suitable shape, such as the conical design shown in FIG. 10. Plug head 203 is connected to solenoid armature 205, which is actuated by electro magnet 207 upon energization of electro magnet 207 into an upper, retracted position (not shown), and which assumes the steady/state position shown in FIG. 10 when electro magnet 207 is de-energized and the pressure of the operating fluid $P_H$ is equal to or nearly zero.

As can be seen in FIG. 10, compression springs 224 and 226 center armature 205 and plug head 203 in the position shown, such that there is a gap between valve seat 208 and plug head 203, which allows operating fluid to pass there between to permit the valve to self-drain when $P_H$ equals zero.

Upper and lower centering springs 224, 226 will keep the plug head 203 off of valve seat 208 when no fluid pressure is present. When fluid pressure is applied at inlet 201, fluid will momentarily rush around the plug, lowering the pressure around the plug and thus pulling the plug into contact with valve seat 208. This action is assisted by the fluid pressure on top of plug head 203. Once plug head 203 touches valve seat 208, the fluid pressure on top of the plug will keep the plug tightly in place cutting off fluid flow to the outlet 211. Energizing solenoid electro magnet 207 will cause armature 205 to be raised and thus lifting the plug head 203 off of valve seat 208, allowing fluid to flow through the valve as desired. The energizing solenoid electro magnet 207 will allow upper centering spring 224 to exert force on spring retainer 222, causing armature 205 and plug head 203 to be lowered into the position shown in FIG. 10, unless operating fluid is flowing through the valve, in which case the operating fluid will cause plug head 203 to come into contact with valve seat 208 and close the valve. Removing operating fluid pressure from the inlet 201 will allow lower centering spring 226 to lift the plug head 203 off of seat 308. This position will open the valve for the desired effect, allowing the inlet 201 and outlet 211 to communicate, thus draining the valve and associated piping in either direction.

Obviously, numerous modifications and variations of the present invention are possible in light of the above teachings. It is therefore to be understood that, within the scope of the appended claims, the invention may be practiced otherwise than as specifically described herein.

What is claimed is:

1. A self draining fluid flow control diaphragm valve, comprising:
   an inlet manifold;
   an outlet tube defining an inlet seat at one end thereof;
   a diaphragm positioned between said inlet manifold and said outlet tube, wherein said diaphragm includes a control opening that controls a flow of fluid from said inlet manifold to said outlet tube, moves in registry with said outlet tube responsive to a presence or absence of fluid supply pressure in said inlet manifold and against said diaphragm, and is arranged so as to provide a gap between said inlet seat and said diaphragm in an absence of fluid supply pressure against said diaphragm, and wherein said control opening is located in a portion of said diaphragm that is in registry with an opening in said outlet tube; and
   a solenoid armature positioned so as to selectively engage said control opening to assist in seating said diaphragm against said inlet seat.

2. The valve of claim 1, wherein said inlet manifold defines a chamber between a fluid inlet and said diaphragm; wherein when (i) said solenoid armature is engaged with said control opening, (ii) said diaphragm is seated against said inlet seat and (iii) fluid supply pressure is present in said inlet manifold, a pressure in said chamber is substantially equal to said fluid supply pressure and fluid does not flow from said inlet manifold to said outlet tube; wherein when said solenoid armature is disengaged from said control opening and fluid supply pressure is present in said chamber, fluid flows through said control opening into said outlet tube decreasing the pressure in said chamber and unseating said diaphragm from said inlet seat; and wherein when said solenoid armature is disengaged from said control opening and fluid supply pressure is substantially zero in said inlet manifold, said diaphragm is spaced from said inlet seat thereby allowing residual fluid to flow from said inlet manifold to said outlet tube.

3. A self draining fluid flow control valve, comprising:
   a fluid inlet;
   a fluid discharge with an inlet seat on one end;
   a flow control member positioned between said fluid inlet and said fluid discharge so as to allow movement thereof in registry with said inlet seat responsive to a presence or absence of fluid supply pressure in said fluid inlet and against said flow control member, said flow control member being further disposed so as to provide a gap between said inlet seat and said flow control member in the absence of said fluid supply pressure.

4. The valve of claim 3, wherein said flow control member includes a rim hole configured so as to cause said flow control member to sealingly press against said inlet seat upon application of said fluid supply pressure against said flow control member.

5. The valve of claim 3, wherein said flow control member includes a control opening that controls a flow of fluid from said fluid inlet to said fluid discharge, the valve further comprising:
   a chamber between said fluid inlet and said flow control member; and
   an electrically actuatable armature positioned so as to selectively engage said control opening to assist in seating said flow control member against said inlet seat;

wherein when (i) said armature is engaged with said control opening, (ii) said flow control member is seated against said inlet seat and (iii) fluid supply pressure is present in said chamber, fluid does not flow from said fluid inlet to said fluid discharge; wherein when said armature is disengaged from said control opening and fluid supply pressure is present in said chamber, fluid flows through said control opening into said fluid discharge decreasing the pressure in said chamber and unseating said flow control member from said inlet seat; and wherein when said armature is disengaged from said control opening and fluid supply pressure is substantially zero in said chamber, said flow control member is spaced from said inlet seat thereby allowing residual fluid to flow from at least one of said fluid inlet and said chamber to said fluid discharge.

6. A method of operating a self-draining fluid control valve, comprising the steps of:

providing a valve body within an inlet manifold, an outlet conduit defining a seat, and a sealing diaphragm positioned for movement between a first, flow interrupted position in contact with said seat and a second, open flow position spaced from said seat, wherein said diaphragm defines a control opening that controls a flow of fluid from said inlet manifold to said outlet conduit;

applying fluid under pressure through said inlet manifold and against said diaphragm;

sealing said control opening causing said fluid to move said diaphragm to said first, flow interrupted position in contact with said seat;

unsealing said control opening causing said fluid to flow through said control opening into said outlet conduit and further causing said diaphragm to move to said second, open flow position spaced from said seat; and releasing said fluid from said inlet manifold causing said diaphragm to occupy said second, open flow position spaced from said seat.

7. A self-draining fluid flow control valve, comprising:

an inlet manifold fluidly communicated with an outlet manifold;

a resilient diaphragm adapted to selectively seal the inlet manifold from the outlet manifold upon the introduction of a pressurized fluid into the inlet manifold and against the diaphragm;

wherein the inlet manifold is fluidly communicated with the outlet manifold in the absence of the pressurized fluid in the inlet manifold and against the diaphragm.

8. The valve of claim 7, wherein the outlet manifold is movable relative to the inlet manifold so as to permit movement of the outlet manifold closer to or further away from the diaphragm.

9. The valve of claim 8, wherein the inlet manifold is defined by a valve body, the outlet manifold is defined by an outlet manifold body, and the outlet manifold body is movable relative to the valve body.

10. The valve of claim 7, wherein the inlet manifold defines a chamber between a fluid inlet and the diaphragm; wherein the diaphragm defines a control opening that controls a flow of the pressurized fluid from the inlet manifold to the outlet manifold; wherein (i) when the diaphragm is positioned to seal the inlet manifold from the outlet manifold, (ii) the control opening is sealed, and (iii) the pressurized fluid is present in the inlet manifold, a pressure in the chamber is substantially equal to a pressure of the pressurized fluid and the pressurized fluid does not flow from the inlet manifold to the outlet manifold; wherein when the control opening is unsealed and pressurized fluid is present in the chamber, the pressurized fluid flows through the control opening into the outlet manifold decreasing the pressure in the chamber and causing the diaphragm to reposition such that the diaphragm does not seal the inlet manifold from the outlet manifold; and wherein when the pressure in the chamber is substantially zero and pressurized fluid is absent from the inlet manifold, the diaphragm is positioned such that the diaphragm does not seal the inlet manifold from the outlet manifold thereby allowing residual fluid to flow from the inlet manifold to the outlet manifold.

11. A self-draining fluid flow control valve, comprising:

an inlet manifold;

an outlet tube;

a solenoid armature;

a valve member positionable for sealing engagement between the inlet manifold and the outlet tube movable between a first, open flow, position and second, flow interrupting, position; said valve member moving to the first, open flow, position when pressure within operating fluid present in the inlet manifold is reduced to substantially zero; said valve member being positioned in the second, flow interrupted, position when pressure within the operating fluid present in the inlet manifold is raised above substantially zero and the solenoid armature engages said valve member; and said valve member being positioned in the first, open flow, position when pressure within operating fluid present in the inlet manifold is raised to above substantially zero and the solenoid armature disengages said valve member.

12. The self-draining valve of claim 11, wherein the valve member is held in position relative to the outlet tube by upper and lower retaining springs retained by a retaining member attached to a solenoid armature, which in turn is attached to the valve member.

13. The self-draining valve of claim 11, wherein the valve member is a resilient plug.

14. The self-draining valve of claim 11, wherein the valve member is a resilient diaphragm.

* * * * *